(12) United States Patent
Cerniglia

(10) Patent No.: US 7,431,581 B2
(45) Date of Patent: *Oct. 7, 2008

(54) RETAINING DEVICE

(76) Inventor: Anthony J. Cerniglia, 1160 Wauconda Rd., Wauconda, IL (US) 60084

( * ) Notice: Subject to any disclaimer, the term of this patent is extended or adjusted under 35 U.S.C. 154(b) by 0 days.

This patent is subject to a terminal disclaimer.

(21) Appl. No.: 11/625,268

(22) Filed: Jan. 19, 2007

(65) Prior Publication Data

US 2008/0085337 A1 Apr. 10, 2008

Related U.S. Application Data

(63) Continuation-in-part of application No. 10/997,434, filed on Nov. 24, 2004, now Pat. No. 7,229,269.

(60) Provisional application No. 60/588,821, filed on Jul. 16, 2004.

(51) Int. Cl.
*B29C 45/17* (2006.01)

(52) U.S. Cl. .................. 425/192 R; 425/556; 425/577; 425/589; 425/441

(58) Field of Classification Search ............ 425/192 R, 425/214, 441, 444, 472, 556, 577, 589
See application file for complete search history.

(56) References Cited

U.S. PATENT DOCUMENTS

| | | | |
|---|---|---|---|
| 3,811,645 A | 5/1974 | Feist | |
| 4,174,939 A | 11/1979 | Fenner | |
| 4,403,810 A | 9/1983 | Bieneck | |
| 4,515,342 A * | 5/1985 | Boskovic | .................... 425/577 |
| 4,765,585 A * | 8/1988 | Wieder | .................... 425/192 R |
| 4,828,480 A | 5/1989 | Smith | |
| 4,998,875 A | 3/1991 | Starkey | |
| 5,227,178 A * | 7/1993 | Rieker | ..................... 425/556 |

(Continued)

FOREIGN PATENT DOCUMENTS

JP 8-90609 * 4/1996

(Continued)

OTHER PUBLICATIONS

Product Description for "Slide Retainer & Positioners"; National Tool and Manufacturing Co., May 2004.

(Continued)

*Primary Examiner*—James P. Mackey
(74) *Attorney, Agent, or Firm*—Law Office of Marc D. Machtinger, Ltd.

(57) ABSTRACT

A retaining device for an injection mold is disclosed. The retaining device has a device body which has a top surface and a bottom surface. A live bearing is mounted in the device body such that a portion of the live bearing extends above a top surface of the device body. The device is secured such that the live bearing supports movement of a first portion of the injection mold. A shoulder surface is formed where a body head portion interfaces with a body base portion. A spring is disposed around the body base portion such that a spring top is in communication with the shoulder surface, and a spring bottom extends below the bottom surface of the device body. The spring creates a "pre-load" force that will hold the slide in place. Optional washers can be added to the device to adjust the "pre-load."

4 Claims, 5 Drawing Sheets

U.S. PATENT DOCUMENTS

| | | |
|---|---|---|
| 5,234,329 A | 8/1993 | Vandenberg |
| 5,312,243 A | 5/1994 | Mertz |
| 5,397,226 A * | 3/1995 | Vandenberg ............ 425/192 R |
| 5,407,344 A | 4/1995 | Rombalski, Jr. et al. |
| 6,116,891 A | 9/2000 | Starkey |
| 6,126,429 A | 10/2000 | Burger et al. |
| 6,443,723 B1 * | 9/2002 | Buttigieg .................... 425/577 |
| 6,589,044 B2 | 7/2003 | Navarra-Pruna |
| 7,229,269 B2 * | 6/2007 | Cerniglia ................ 425/192 R |
| 2002/0025359 A1 | 2/2002 | Navarra-Pruna |

FOREIGN PATENT DOCUMENTS

| | | | |
|---|---|---|---|
| JP | 2000-346106 | * | 12/2000 |
| JP | 2001-18262 | * | 1/2001 |

OTHER PUBLICATIONS

Product Description for "SmartLock Slide Retainer and Limit Switch" and "Mini-Might Slide Retainers"; D-M-E Standard, Date Unknown.

Product Description for "Slide Retainers"; D-M-E Standard, Date Unknown.

Product Description for "Slide-Lock", pp. 190-193A; 1989 Superior Die Set Corp. Revised Jan. 1992.

Product Description for "Slide Lock: Quality Slide Retention Components", pp. 2-4; 1997 Superior Die Set Corp.

Product Description from website (hasco.com) of the "Slide Retainer Z 189"; 2004 HASCO.

Product Description for "Retainers", Catalogue Number RET-1, p. C-32; Progressive Components. Date Unknown.

* cited by examiner

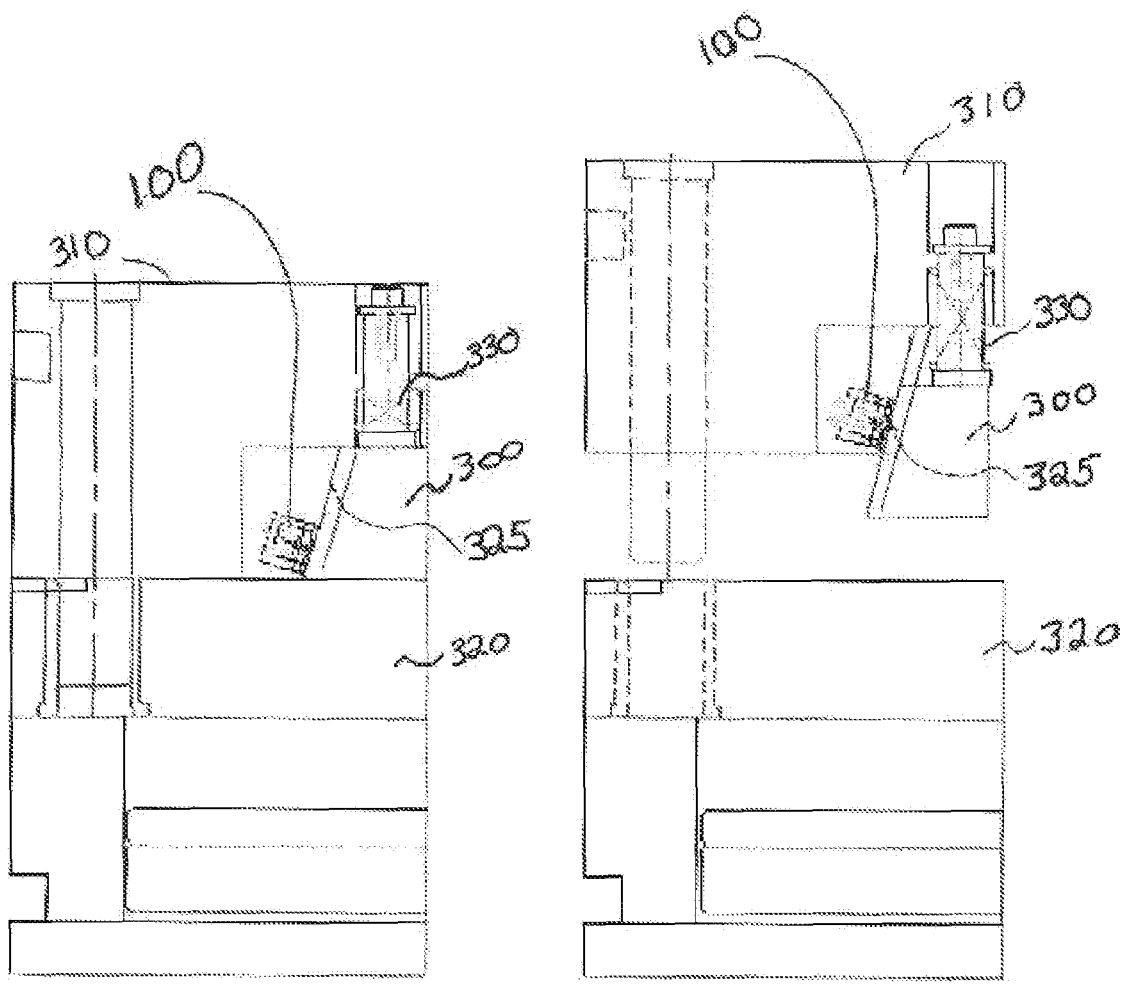

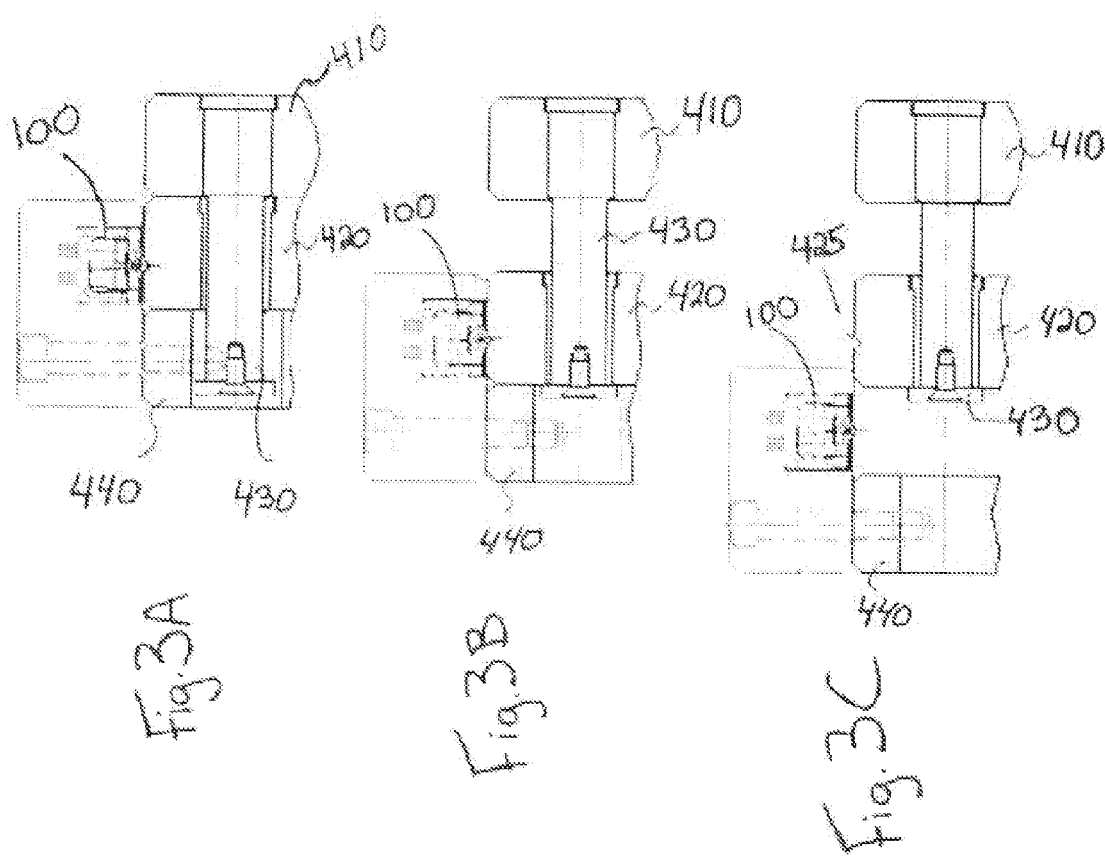

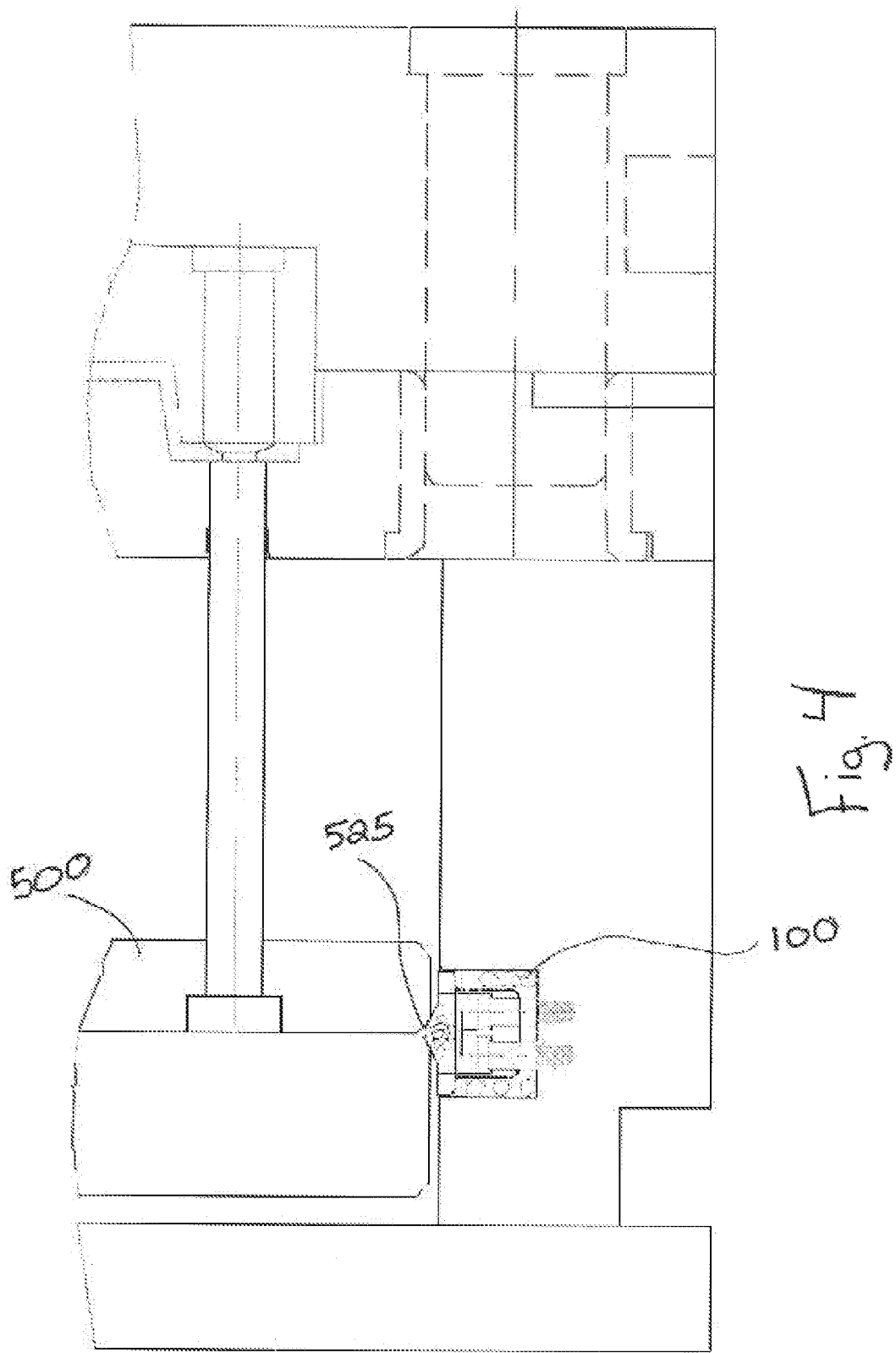

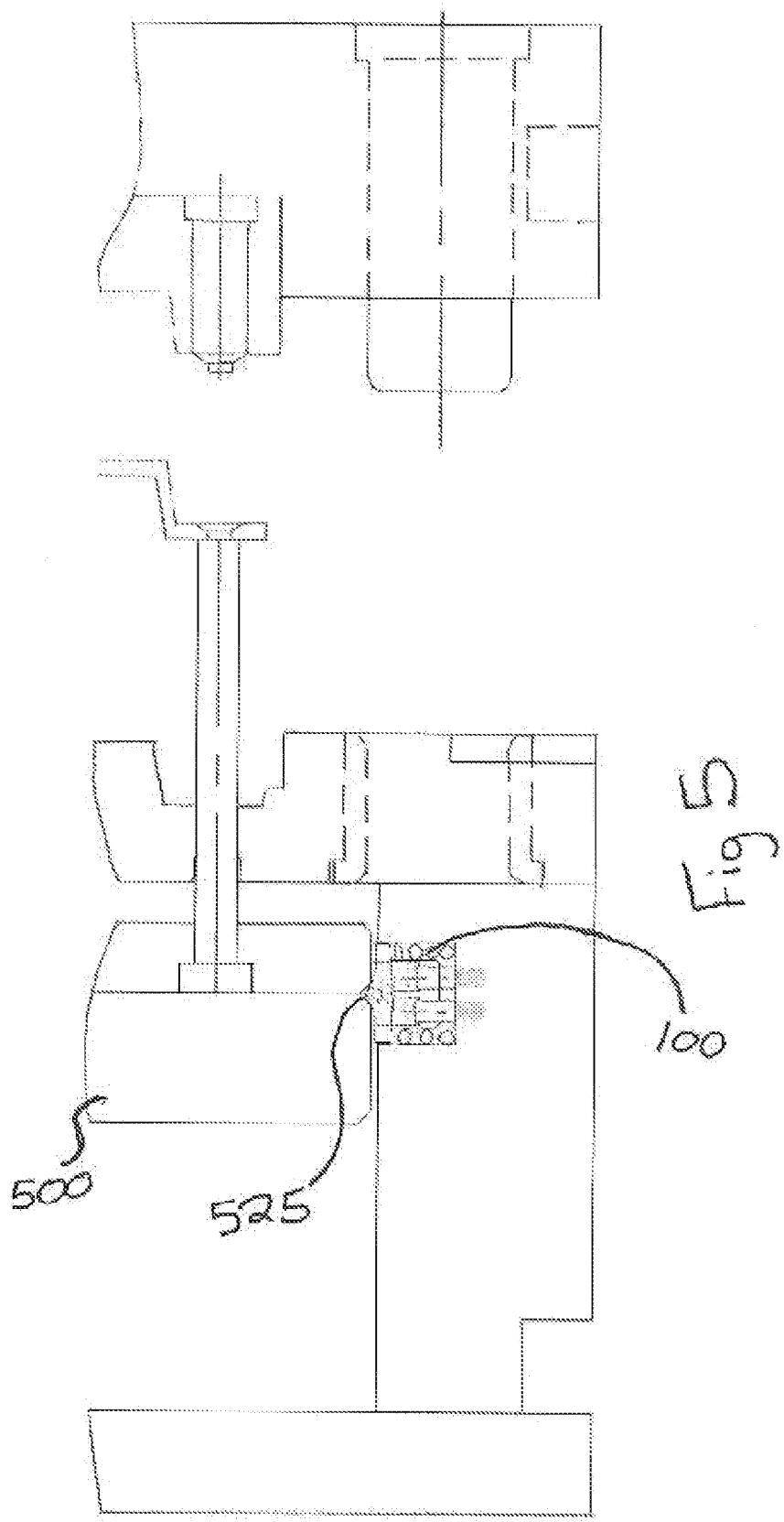

RETAINING DEVICE

CROSS-REFERENE TO RELATED APPLICATION

This application is a Continuation-In-Part of U.S. Nonprovisional patent application Ser. No. 10/997,434, filed on Nov. 24, 2004, now U.S. Pat. No. 7,229,269, which claims the benefit of U.S. Provisional Patent Application No. 60/588,821, filed Jul. 16, 2004, each of which is hereby incorporated by reference in its entirety.

FIELD OF THE INVENTION

The present invention relates to injection molding devices, and more specifically to a device to retain a portion of an injection mold in a desired position for at least a desired portion of the injection mold cycle.

DESCRIPTION OF THE RELATED ART

In typical injection molds, the mold cavity is created from plates that abut each other at a parting line. When the mold is opened, these plates move apart from one another such that the molded part can be removed or ejected. In many injection molds, the mold cavity is further defined by one or more pieces that move perpendicular to the plates as the mold is opened and closed. These perpendicularly moving pieces are attached to slides which typically are moved by angle pins. The angle pin is received through an angled bore extending through the slide. In normal opening movement of the mold, the angle pin forces the slide laterally away from the molded piece along a guided path.

It is desirable to retain the slide in the retracted position to prevent unintentional slide closure. Several slide retainers are known in the art. For example, U.S. Pat. No. 3,811,645, issued to Feist (Feist retainers), discloses a slide retainer and positioner. The retainer in Feist includes a set of spring-biased jaws that grip an element, such as a pin or rod, installed on the slide when the slide is moved to the open position.

Another type of slide retainer is disclosed in U.S. Pat. No. 5,397,226, issued to Vandenberg and assigned to the D-M-E Company of Madison Heights, Mich. (Vandenberg retainers). Vandenberg retainers are characterized by a circular body having a lip section, and a flat key section formed on one side of the lip section. A plunger having an elongated rounded plunger head is received in a cavity formed in the body. A spring is held in the cavity by a threaded plug and biases the plunger head to extend up through an opening in the top of the body. The rounded plunger head is designed to mate with a groove formed in the bottom surface of the slide.

There are several drawbacks to slide retainers based on the Feist design. First, slide retainers having different holding strengths are not of uniform size, thus if the slide designer miscalculates the required necessary holding strength, a replacement slide retainer of greater or lesser holding strength will not fit in the pocket created for the original slide retainer. Furthermore, slide retainers according to the Feist design lack adjustability, meaning different retainers must be purchased for different holding strengths. Second, these slide retaining devices require complicated machining processes to facilitate their installation. Not only does the slide retainer have to be installed into a relatively large pocket, milled into the core plate of the injection molding machine, the pin or rod also has to be installed in the slide. Any misalignment of the retainer and the pin usually results in damage to the mold and mold components. Furthermore, the large pocket into which the slide retainer is installed takes up valuable space in the injection mold.

Similarly, there are several drawbacks to slide retainers based on the Vandenberg design. First, slide retainers having different holding strengths are not of uniform size, which leads to the same problems mentioned above. Like the Feist retainers, the Vandenberg retainers lack adjustability. Additionally, the installation process for the Vandenberg retainers requires complex milling operations, such as the milling for the lip section and key sections.

In addition to retaining a slide in a desired position, in various injection molds, there exists a need to retain a portion of the injection mold in a desired position for at least a desired portion of the injection mold cycle. These operations involving first movement of one portion of the mold and then another portion of the mold can generically be referred to as sequencing. An example of sequencing can occur in a three-plate or multi-plate mold, where it may be desirable to retain at least one of the plates in a particular position while one or more of the other plates are moved, then when the other plate or plates have moved as desired, it may be desirable for the previously retained plate to move.

Often, spring and rod set ups are used to sequence platen movement in an injection mold. To accomplish this, the springs typically have to be relatively long and undergo a high degree of compression, often greater than 50% compression, which greatly reduces spring life.

Another example where a need exists to retain a portion of the injection mold in a desired position arises in relation to the hydraulically actuated portion of the injection mold or injection molding machine. As many injection molds involve relatively complex hydraulic operations and relatively complex hydraulic systems, leaks can develop in the hydraulic system. The leakage results in changes in pressure of the system over time. Large, sudden, leaks can result in catastrophic failures of the injection mold. Potentially as hazardous, but more difficult to remedy are relatively small leaks in the hydraulic system. A small leak, and the corresponding small changes in system pressure over time, can result in a portion of the mold moving slowly over time. This effect can generically be referred to as hydraulic creep. It can be desirable to retain a portion of the injection mold in a desired position such that movement of that portion of the injection mold can only be caused by intended actions of the mold. In other words, the portion of the mold is prevented from moving during small changes in force due to small changes in pressure in the hydraulic system, but will still move when acted on by a relatively larger force.

As the injection mold can be a complex machine, with a high number of moving parts, the mold engineer can often find a need to retain a portion of the mold in a desired position for at least a portion of the injection mold cycle.

Furthermore, there is often a need in injection molds used for clean room or medical applications to minimize the use of lubricants. The use of live bearings to support the travel of parts of the injection mold can reduce or eliminate the need for these lubricants.

There remains a need for a retaining device that can retain a portion of an injection mold in a desired position during at least a portion of the injection mold cycle. Furthermore, there remains a need for a retaining device that employs a live bearing.

SUMMARY

In view of the deficiencies described above, it is an object of the present invention to provide a retaining device that can retain a portion of an injection mold in a desired position during at least a portion of the injection mold cycle.

It is a further object of the present invention to provide a retaining device that has a live bearing device incorporated therein.

It is a further object of the present invention to provide a retaining device suitable for use in clean room and medical mold applications.

The present invention is a retaining device. The retaining device, has a device body which has a top surface and a bottom surface. A live bearing can be mounted in the device body such that a portion of the live bearing extends above the top surface of the device body. The device is secured such that the live bearing supports the travel of a portion of the injection mold. In various preferred embodiments, the live bearing is a roller, which can be mounted on an axel in the device body.

In various preferred embodiments, the device body has a body base portion and a body head portion. The body base portion has a first diameter. The body head portion has a second diameter greater than the first diameter. A shoulder surface is formed where the body head portion interfaces with the body base portion. A spring, which has a top and a bottom, is disposed around the body base portion such that the spring top is in communication with the shoulder surface, and the spring bottom extends below the bottom surface of the device body. The spring creates a "pre-load" force that will hold the slide in place. Optional washers can be added to the device to adjust the "pre-load".

The retaining device 100 of the present invention can be installed in various locations in an injection mold.

Other features and advantages of the invention will be apparent from the following detailed description taken in conjunction with the following figures, wherein like reference numerals represent like features.

BRIEF DESCRIPTION OF THE DRAWINGS

FIGS. 2A and 2B show a retaining device according to the present invention retaining a wedge of an injection mold in a desired position.

FIGS. 3A-3C show a retaining device according to the present invention pulling a plate of an injection mold in to desired position during a sequential movement of plates.

FIG. 4 shows a retainer according to the present invention retaining an ejector system of an injection mold in a first desired position.

FIG. 5 shows a retainer according to the present invention retaining an ejector system of an injection mold in a second desired position.

DETAILED DESCRIPTION OF THE INVENTION

Figure 1A:
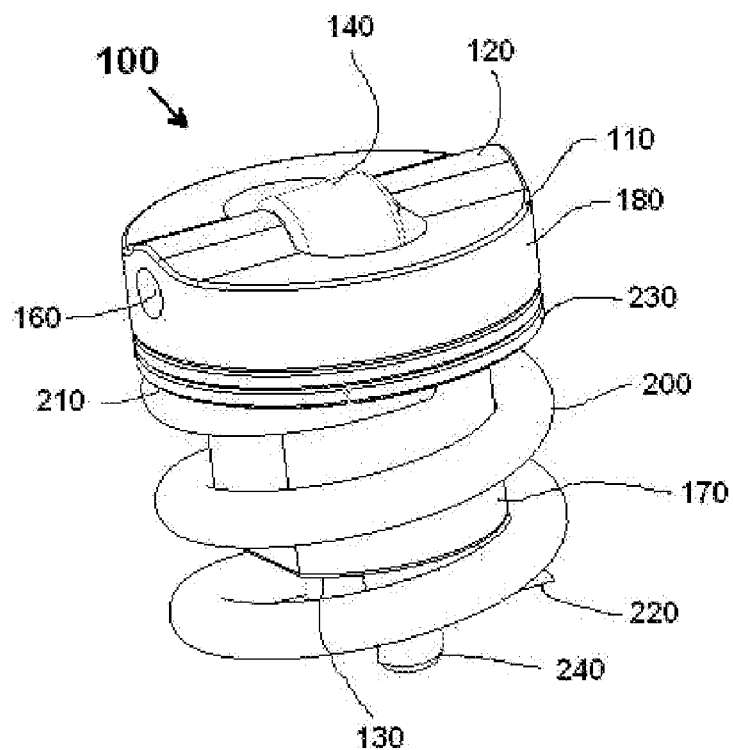
FIG. 1A shows a perspective view of a retaining device according to the present invention.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspect of the invention to the embodiments illustrated.

Figure 1B:
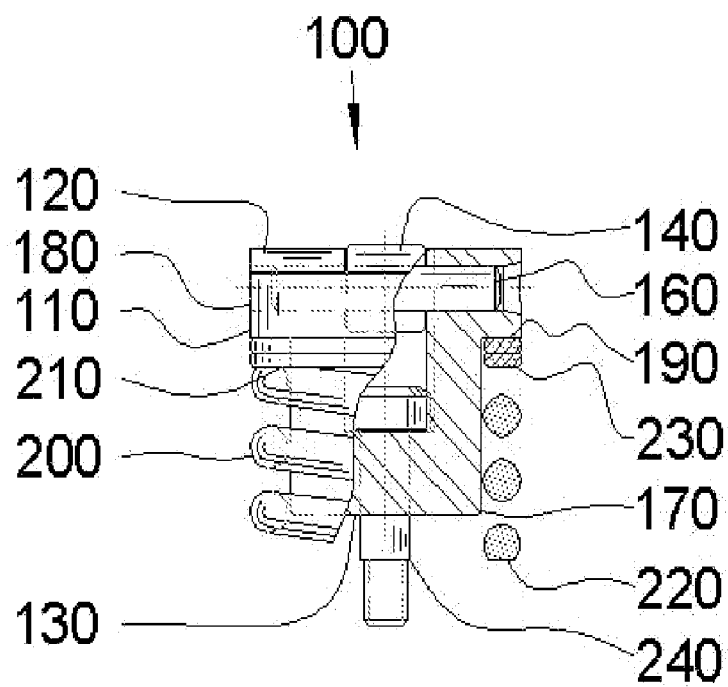
FIG. 1B shows section view of a retaining device according to the present invention.

The present invention is a retaining device. FIG. 1A shows a perspective view of a preferred embodiment of a retaining device according to the present invention. FIG. 1B shows section view of a preferred embodiment of a retaining device according to the present invention. The retaining device 100, has a device body 110 which has a top surface 120 and a bottom surface 130. A live bearing 140 can be mounted in the device body 110 such that a portion of the live bearing 140 extends above the top surface 120 of the device body 110. The device 100 is secured such that the live bearing 140 supports the travel of a portion of the injection mold. In various preferred embodiments, the live bearing 140 is a roller, which can be mounted on an axle 160 in the device body 110. Live bearings 140 of other types known in the art may also be used, including, but not limited to, live bearings having needle bearings or incorporating similar bearing devices.

A live bearing 140 has several advantages. First, the use of a live bearing 140 reduces the risk of galling to the portions of the injection mold in contact with the live bearing 140. Second, the use of a live bearing 140 may reduce or eliminate the need for lubricants to be used in the injection mold action, which is desirable for clean room and medical mold applications.

In various preferred embodiments, the device body 110 has a body base portion 170 and a body head portion 180. The body base portion 170 has a first diameter. The body head portion 180 has a second diameter greater than the first diameter. A shoulder surface 190 is formed where the body head portion 180 interfaces with the body base portion 170. A spring 200, which has a top 210 and a bottom 220, is disposed around the body base portion 170 such that the spring top 210 is in communication with the shoulder surface 190, and the spring bottom 220 extends below the bottom surface 130 of the device body 110. The spring 200 creates a "pre-load" force that will retain the desired portion of the injection mold in place.

Optional washers 230 can be added to the device 100 to adjust the "pre-load". The use of washers 230 allows the same device 110 to be used in areas of the injection mold requiring different retaining forces. Adjustability also allows for error in calculation the retaining forces. Adjustability also allows the same device 100 to be used, without redesign of the injection mold should a revision to the part being manufactured or a revision to the injection mold cause the required retaining forces to change. Furthermore, adjustability simplifies design of the injection mold by only requiring a retaining device 100 of one size. Lastly, the use of washers 230 between the spring 200 and the shoulder surface 190 allows the spring 200 to rotate as the spring 200 is compressed and released, which reduces strain on the spring 200 and the device body 110.

In various embodiments, the device 100 is secured using one or more shoulder screws 240. Shoulder screws 240 are sometimes referred to as stripper bolts and are known in the industry. The shoulder screws 240 are used to hold the device 100 at or below surface level of the component into which the device 100 is installed such that the first point of contact is the live bearing 140. Preferably, the shoulder screws 240 have a socket head or other common head to facilitate installation.

The retaining device 100 of the present invention can be installed in various locations in an injection mold. FIGS. 2A and 2B show a retaining device according to the present invention retaining a wedge of an injection mold in a desired position. In FIG. 2A the injection mold is in the mold closed position. As the mold opens, plates 310 and 320 begin to separate. At the same time, spring 330 urges wedge 300 down. Movement of the wedge 300 is supported by live bearing 140 in device 100. When the wedge 300 reaches a desired location, indicated by notch 325, the live bearing interacts with notch 325 and retains the wedge 300 at the desired location. This is achieved by the retaining forces exerted by the device 100 via live bearing 140 on the notch 325 being greater in the operative direction than spring 330 can overcome.

FIGS. 3A-3C show a retaining device according to the present invention pulling a plate of an injection mold in to desired position during a sequential movement of plates. In FIG. 3A the injection mold is in the closed position. As the mold opens, plate 440 is set into motion. The retaining force of retaining device 100 is exerted on plate 420 through notch 425. Plate 420 and plate 410 begin to separate. As the mold opens, plates 410 and 420 begin to separate. Connected to plate 410 is stop 430. Stop 430 passes through plate 420 and into a cavity or slot in plate 440. Plate 420 moves with plate 440 the desired distance until stop 430 engages plate 420. Stop 430 exerts enough force on plate 420 to overcome the retaining force of retaining device 100. Live bearing 140 supports movement of plate 420 for a portion of the movement of plate 420.

FIG. 4 shows a retainer according to the present invention retaining an ejector system of an injection mold in a first desired position. FIG. 5 shows a retainer according to the present invention retaining an ejector system of an injection mold in a second desired position. An ejector system, shown as 500, as the name implies, is what ejects the molded part from the injection mold, thus making room in the mold cavity for a new part to be molded. The sequencing and movement of the ejector system 500 is important so as to not damage the part just molded and not to try to eject the part until all other portions of the injection mold, such as a side action, have been moved away from the part. Thus, it is desirable to prevent any hydraulic creep or other unintentional movements of the ejector system. Retaining device 100 can be used to retain the ejector system 500 in a first position, as shown in FIG. 4. Any movement of the ejector system away from this first position must overcome the retaining force exerted on the ejector system 500 by the retaining device 100. The retaining force of retaining device 100 is exerted on the ejector system 500 through notch 525. Similarly, retaining device 100 can also be used to retain the ejector system 500 in a second position, as shown in FIG. 5. Live bearing 140 supports movement of the ejector system 500 while live bearing 140 is in contact with the ejector system 500.

While specific embodiments have been illustrated and described, numerous modifications come to mind without significantly departing from the spirit of the invention and the scope of protection is limited by the scope of the accompanying claims.

What is claimed is:

1. An injection mold comprising:
   a retaining device having a device body, said device body having a top surface and a bottom surface,
   a live bearing mounted in said device body, wherein a portion of said live bearing extends above said top surface of device body,
   means for securing said device such that said live bearing supports movement of a first portion of said injection mold from at least a portion of a movement of said first portion from a first position to a second position,
   wherein said device body has a body base portion and a body head portion,
   wherein said body base portion has a first diameter,
   wherein said body head portion has a second diameter greater than said first diameter, and a shoulder surface formed where said body head portion interfaces with said body base portion,
   said device further comprises a spring, said spring having a top and a bottom, wherein said spring is disposed around said body base portion, said spring top in communication with said shoulder surface of said body head portion, and said spring bottom extends below said bottom surface of said device body wherein said live bearing is mounted on an axle secured in said device body.

2. The injection mold according to claim 1, wherein said first portion of said injection mold comprises a wedge.

3. The injection mold according to claim 1, wherein said first portion of said injection mold comprises a plate.

4. The injection mold according to claim 1, wherein said first portion of said injection mold comprises an ejector system.

* * * * *